United States Patent [19]

Rozycki

[11] Patent Number: 5,214,830
[45] Date of Patent: Jun. 1, 1993

[54] APPARATUS FOR RECYCLING USED OIL FILTERS

[76] Inventor: Richard R. Rozycki, 22325 Provincial, Woodhaven, Mich. 48183

[21] Appl. No.: 753,429

[22] Filed: Aug. 30, 1991

[51] Int. Cl.⁵ .............................................. B23P 19/02
[52] U.S. Cl. ............................. 29/240; 29/DIG. 67; 100/902; 30/434; 30/441; 82/92; 82/101
[58] Field of Search ............... 29/403.3, 426.2, 426.3, 29/426.4, 801, 822, 240, DIG. 67; 100/902; 30/417, 418, 424, 426, 434, 441; 82/92, 101

[56] References Cited

U.S. PATENT DOCUMENTS

| | | | |
|---|---|---|---|
| 539,971 | 5/1895 | Anderson | 30/434 |
| 1,522,319 | 1/1925 | Nolan | 30/434 |
| 3,589,276 | 6/1971 | Swallert | |
| 3,608,192 | 9/1971 | Harsel | 30/441 |
| 3,828,976 | 8/1974 | Sidelinker | |
| 3,900,948 | 8/1975 | Kammeraad | 30/441 |
| 4,072,273 | 2/1978 | Reiniger | |
| 4,284,514 | 8/1981 | Wright | |
| 4,314,674 | 2/1982 | Cerroni | |
| 4,418,460 | 12/1983 | Ruth | 29/426.3 |
| 4,418,594 | 12/1983 | Burrs, Jr. | 100/902 |
| 4,827,840 | 5/1989 | Kane | |
| 4,830,188 | 5/1989 | Hannigan et al. | |
| 4,917,313 | 4/1990 | Morris | |
| 4,927,085 | 5/1990 | Oberg | 100/902 |
| 5,060,564 | 10/1991 | Buford et al. | 100/902 |
| 5,067,529 | 11/1991 | Gonzalez-Miller et al. | 29/801 |
| 5,109,763 | 5/1992 | Morris et al. | 100/902 |
| 5,125,331 | 6/1992 | Wood | 100/902 |

Primary Examiner—P. W. Echols
Assistant Examiner—David P. Bryant
Attorney, Agent, or Firm—Dykema Gossett

[57] ABSTRACT

An apparatus for recycling used oil filters is disclosed wherein an oil filter canister of the type having a base portion and a cover portion enclosing a pleated filter element is placed in a separating means wherein the filter cover is separated or cut from the filter base to expose the pleated filter element. The oil filter cover is sent to a crusher, while the pleated filter element is sent to a spin means or centrifuge to remove excess oil therefrom. Miscellaneous parts are then removed from the oil filter and sent to scrap bin. The pleated filter element, having the oil removed, is suitable for use in landfills. The separating means and the spin means provide for the collection of used motor oil in an oil reservoir.

13 Claims, 3 Drawing Sheets

APPARATUS FOR RECYCLING USED OIL FILTERS

BACKGROUND OF THE INVENTION

1. Field of the Invention

The present invention relates to a method and apparatus for recycling. More particularly, the invention relates to a method and apparatus for recycling used oil filters to permit the reclaiming of used motor oil, the used oil filter element, and a substantial portion of the filter cover.

2. Description of the Prior Art

The disposal of used motor oil has long been one of the main environmental problems facing the earth's population. Used motor oil contains toxic heavy metals such as lead, chromium and cadmium, and even some dangerous organic chemicals. It is estimated that every year more than 170 million gallons of used oil is improperly disposed of. Because sewage plants are not designed to deal with used motor oil, such oil often passes through storm sewers directly into rivers, wetlands and the ocean, posing a threat to all aquatic life, as well as to the drinking water for all the nation's cities. For these reasons, and because most of the used motor oil comes from disposal of used oil filters from automotive vehicles, there has been an ongoing search for ways to easily reclaim the oil in used oil filters, and to reclaim the metal and used filter elements therefrom.

Applicant is familiar with one pilot recycling program started in the State of California because of government regulations which classify filters as hazardous waste unless a special toxicity characteristic leaching procedure proves otherwise. This pilot program essentially involves gravity draining the filters to remove a large portion of the oil, and then melting down the filters and recasting the metal as reinforcing bar. However, this type of program makes no use of the used filter elements, does not remove enough of the oil before the filters are melted down, and is an expensive process.

Another means of recycling used oil filters simply involves crushing of the filters after the oil is drained. This presents the problem of toxic fumes from the oil left in the filters when further recycling takes place, as does the melting and recasting process previously described. Thus, there remains a need in the art for a clean economical method of recycling used oil filters.

A search of patents at the United States Patent and Trademark Office also revealed no solution to the problem. The following patents were located during such a search, none of which revealed a satisfactory solution to the problem of how to recycle used oil filters:

| Patentee | U.S. Pat. No. |
| --- | --- |
| Morris | 4,917,313 |
| Hannigan | 4,830,188 |
| Kane | 4,827,840 |
| Cerroni | 4,314,674 |
| Wright | 4,284,514 |
| Reiniger | 4,072,273 |
| Sidelinker | 3,828,976 |
| Swallert | 3,589,276 |

SUMMARY OF THE INVENTION

In accordance with the present invention, there is provided a method and apparatus for recycling of used oil filters involving the steps of placing a used oil filter in an inverted position on a apparatus having a gripping means to grip the filter and a rotating means to rotate the filter, all while a reservoir collects the oil draining out of the filter. Separating means then separate the filter cover from the filter base to provide access to the filter element. The filter cover is cleaned and crushed, providing clean scrap metal for reprocessing. The filter element is spun or centrifuged to remove the oil therefrom, thus removing a larger amount of oil from a used oil filter than was heretofore known. The clean filter element is then ready for use in landfills, thus providing an economical use for these used filter elements which was unknown before the present invention.

In a first embodiment of the present invention, there is provided a method and apparatus for separating a filter canister cover from the filter canister base to provide access to the filter element inside an oil filter, and for spinning the filter element to remove the excess oil therefrom.

In a second embodiment of the invention, there is provided a method and apparatus whereby the cover portion of the filter canister is separated from the base portion of the filter canister by a cutting apparatus, the oil filter element is centrifuged or spun to remove the oil therefrom, and the filter cover is cleaned and crushed to provide a clean product for further recycling. The steps of sending the recovered oil to an oil recycling center, sending the filter element to a landfill, and sending the filter cover for further recycling are also disclosed.

Thus, an object of the present invention is to provide an improved method and apparatus for the recycling of used oil filters.

A further object of the present invention is to provide a method of recycling used oil filters of the type having a filter element contained within a filter canister having a base portion and a cover portion by separating the cover portion of said filter canister from the base portion to gain access to the filter element, and spinning or centrifuging said filter element to remove the excess oil therefrom.

A further object of the present invention is to provide a method of the foregoing nature, including the further steps of crushing the oil filter cover and removing the miscellaneous parts of the oil filter from the base portion thereof.

A further object of the present invention is the provide a method of recycling used oil filters wherein the separating of the cover portion of the filter canister from the base portion involves a cutting operation.

A further object of the present invention is to provide an apparatus for recycling used oil filters wherein a gripping means can grasp the used oil filter in an inverted position, and a rotating means may rotate the filter, while a cutting apparatus separates the filter cover from the filter base to provide access to the filter element.

A still further object of the present invention is to provide a method and apparatus for recycling of used oil filters in which the used filter element is cleaned and usable in a landfill.

A still further object of the present invention is to provide an improved method and apparatus for recycling used oil filters wherein larger amounts of oil are recovered than in other processes.

A still further object of the present invention is to provide an improved apparatus for recycling of used oil filters wherein the filter cover is removed from the filter base, and is available for further recycling.

Further objects and advantages of this invention will be apparent from the following description and dependent claims, reference being had to the accompanying drawings forming a part of the specification, wherein like reference characters designate corresponding parts in the several views.

It is to be understood that the present invention is not limited in its application to the details of construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description, and not of limitation.

DESCRIPTION OF THE PREFERRED EMBODIMENTS

Figure 1:
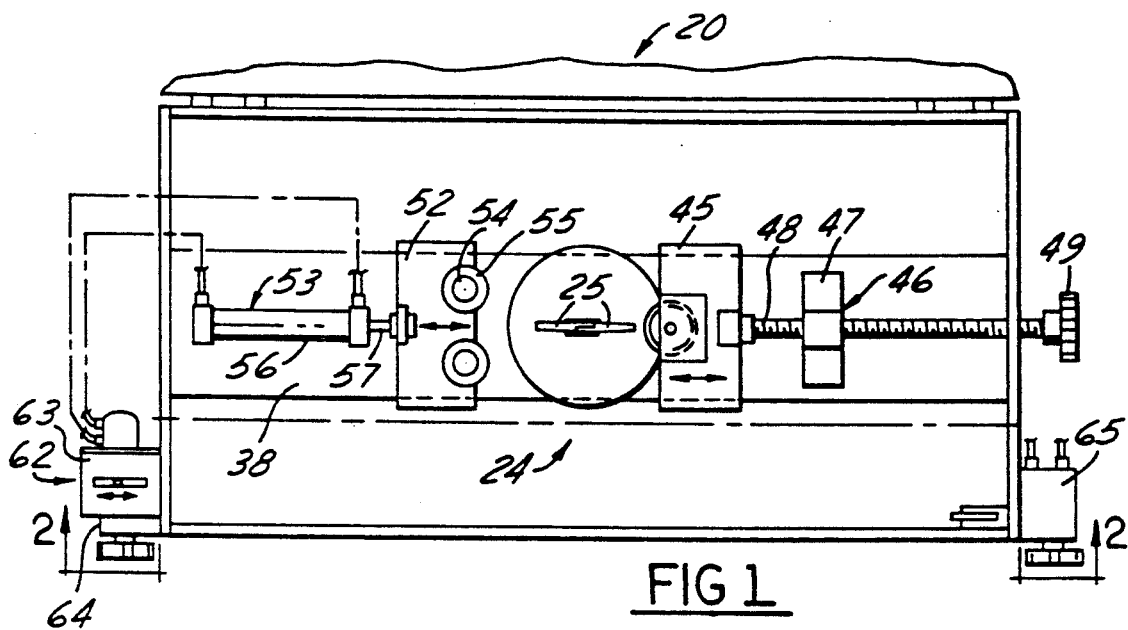
FIG. 1 is a plan view of a construction embodying a large portion of the present invention.
Figure 2:
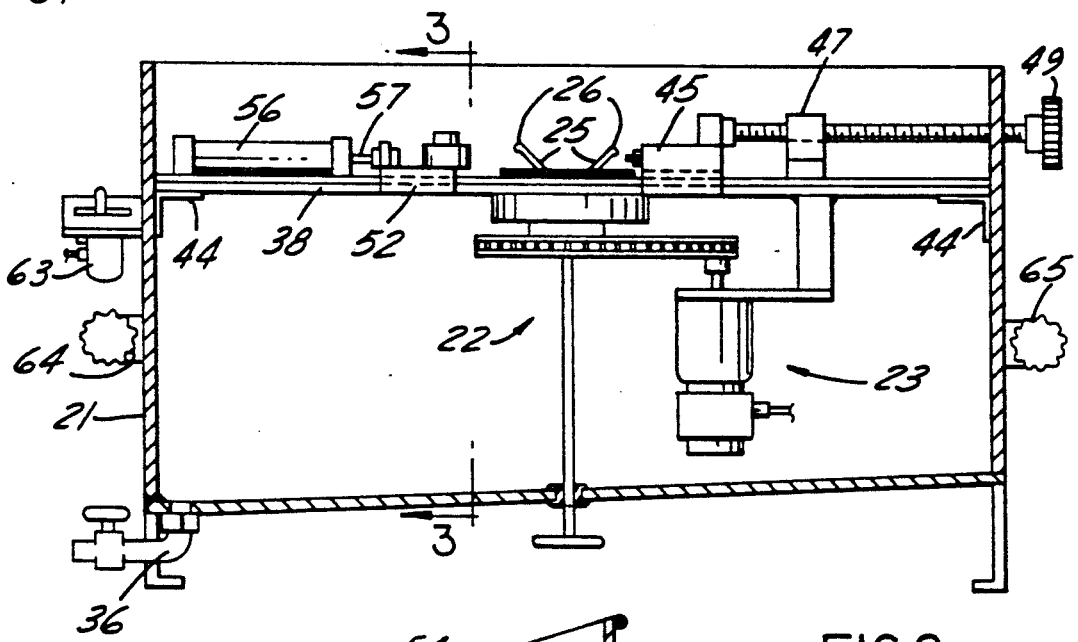
FIG. 2 is a sectional view, taken in the direction of the arrows, along the section line 2—2 of FIG. 1 and showing a reservoir for the gathering of used oil while the separating means of the present invention is separating the filter cover from the filter base.
Figure 3:
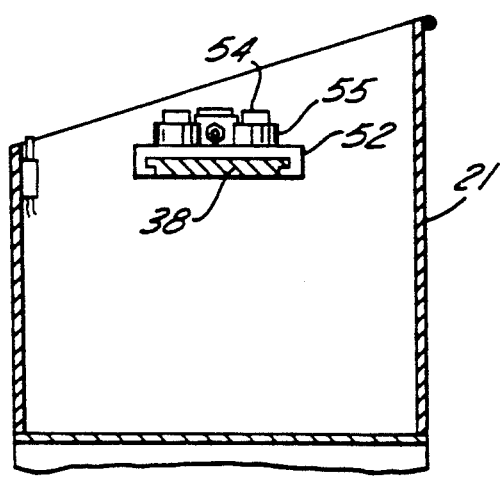
FIG. 3 is a sectional view, taken in the direction of the arrows, along the section line 3—3 of FIG. 2.

Referring now to FIGS. 1-3, there is shown an apparatus for recycling used oil filters, generally designated by the numeral 20. Contained within a reservoir 21 are shown a gripping means 22 for gripping an oil filter, generally designated by the numeral 33, in an inverted position, a rotating means 23 for rotating the oil filter once it is securely placed in the gripping means, and a separating means, generally designated by the numeral 24. A reservoir drain 36 is also provided.

The gripping means, generally designated by the numeral 22 includes a pair of cam operated jaws 25, each having an outwardly extending hook-like portion 26 at the upper extremity thereof, and a cam surface 27 (FIG. 5) at the lower extremity thereof. A ball-bearing 28 is interposed between the cam surfaces 27 and the rod means 29.

Figure 7:
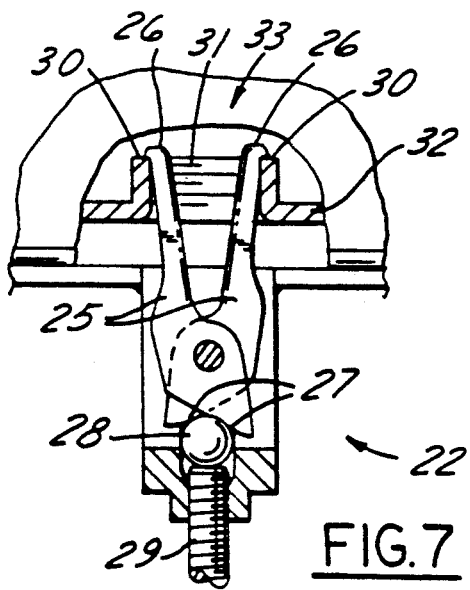
FIG. 7 is a partial sectional view, taken in the direction of the arrows, along the section line 7—7 of FIG. 6.

Any practical rod means may be used, such as a threaded rod which can be manually operated, a hydraulically or air operated cylinder attached to a rod may also be used, or any means known in the art for producing reciprocal movement of a rod-like member may be used. As shown in FIG. 7, hook like portions 26 grasp the end wall 30 of the threaded aperture 31 formed in the base portion 32 of the filter canister generally 33. The filter canister 33 is mounted by means well known in the art to the automotive engine.

Figure 5:
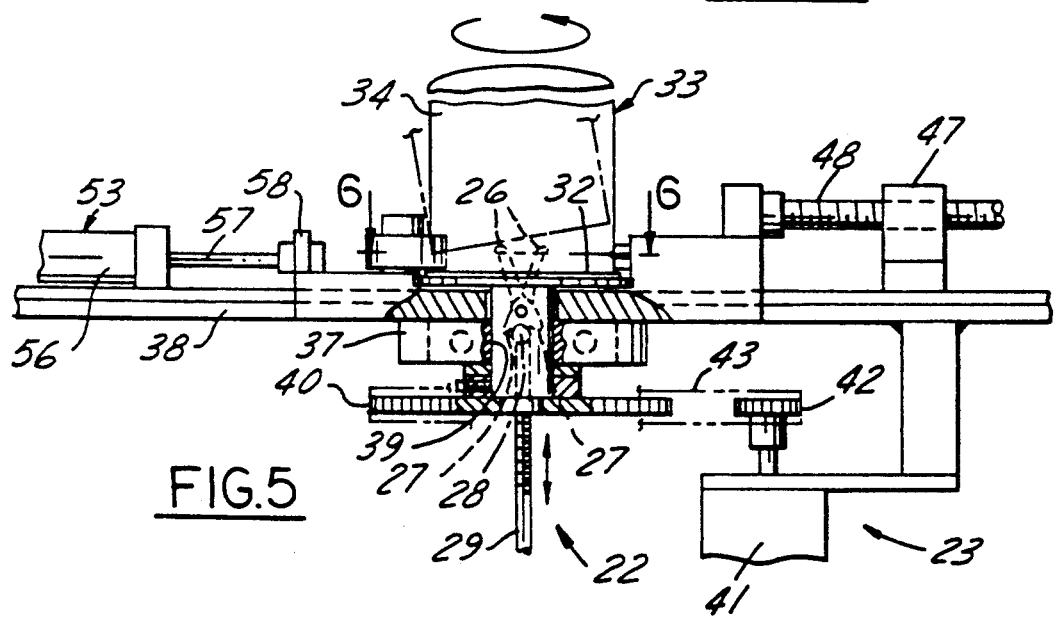
FIG. 5 is an enlarged elevational view of the apparatus of the construction shown in FIG. 2 showing the operation of the gripping means of the present invention in greater detail.

As shown in FIGS. 2 and 5, the gripping means 22 are mounted for rotation to turntable 37. The turntable 37 is journaled for rotation to a base 38, contained within the reservoir 21. The cam operated jaws 25 protrude through central opening 39. Rotating means 23 include a first gear 40, preferably mounted to the turntable 37 in axial alignment therewith, an air motor 41, and a second gear 42, connected by chain 43, to first gear 40. While an air motor and chain drive are preferred, it should be understood that it is well within the scope of the present invention to use many alternate types of drives to form the rotating means 23. Electric motors and belts may be used, as may geared reducing drives, or any other practical type of drive.

Figure 4:
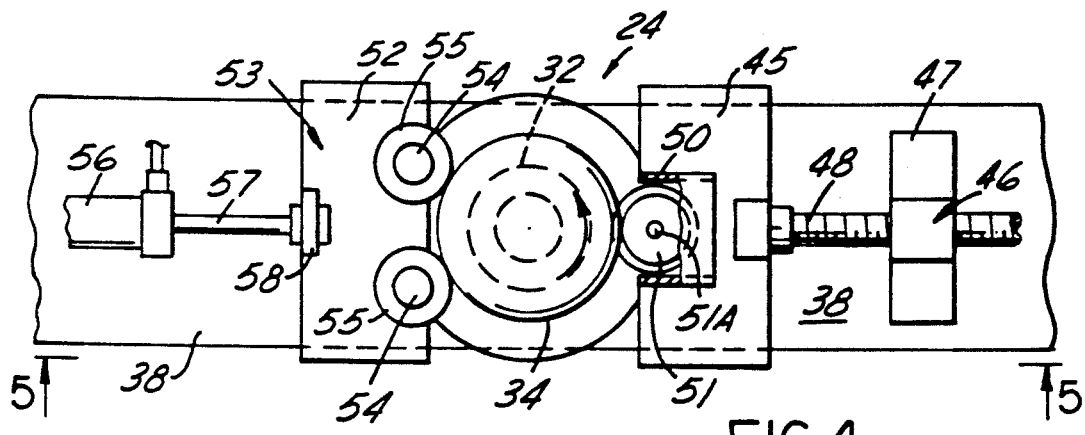
FIG. 4 is an enlarged partial plan view of the apparatus shown in FIG. 1.

Referring now to FIGS. 1 and 4, the means to separate the filter cover 34 from the filter base 32 are illustrated. Many types of separating apparatus could be used in the method of the present invention and work satisfactorily. For example, a "can opener" type apparatus may work satisfactorily to remove the filter cover from the filter base. However, in the preferred embodiment of the invention, an apparatus which may be likened to a "pipe cutter" is used because it can conveniently cut open the filter cansiter 33 while it is in an inverted position, so that the maximum amount of oil is recovered.

A suitable base member 38 is rigidly mounted in a horizontal position between the walls of the reservoir 21 with the aid of angle brackets 44. A first slidable jaw 45 is slidably mounted on the base member 38 for reciprocation by a first adjustment means 46. Said adjustment means may include a threaded member 47 mounted to base member 38 to threadably engage a threaded rod 48 which is connected to the first slidable jaw 45. When the threaded rod 48 is rotated by knob 49, the first slidable jaw 45 will move laterally along the base member 38. With reference to FIG. 1, the jaw will move to the left or right, or reciprocate, depending in which direction the knob 49 is rotated. It should be understood that although a manual adjustment means for the first slidable jaw 45 has been shown, an automatic operating means for the first slidable jaw, with suitable control means, is well within the scope of the present invention.

Mounted in a 180° opposed relationship to the first slidable jaw 45 is a second slidable jaw 52 forming a portion of the second adjustment means 53. Mounted to the second slidable jaw 52, near the forward edge thereof, are a pair of upstanding posts 54. Mounted to the posts 54 for rotation are a pair of circular rollers or supports 55, which will cooperate with circular knife or cutter 51, to cut or separate the filter cover 34 from the base portion 32 of the filter canister 33 in a manner to be described.

Second adjustment means 53 are provided to reciprocate second slidable jaw 52 toward and away from first slidable jaw 45. Second adjustment means 53 may include air cylinder 56, having cylinder shaft 57, which is fixedly mounted to slidable jaw 52 by way of mounting bracket 58. For control of the air cylinder 56 there is provided an air cylinder control means 62 well known in the art. An on/off valve 64 is connected to a suitable air supply (not shown). A directional valve 63 is connected between the air cylinder 56 and the on/off valve 64. Depending on the position of the directional valve, the cylinder shaft 57 will either be advanced toward or away from the turntable 37. An air motor valve 65 also connected to an air supply is used to control the supply of air to the air motor 41.

Figure 6:
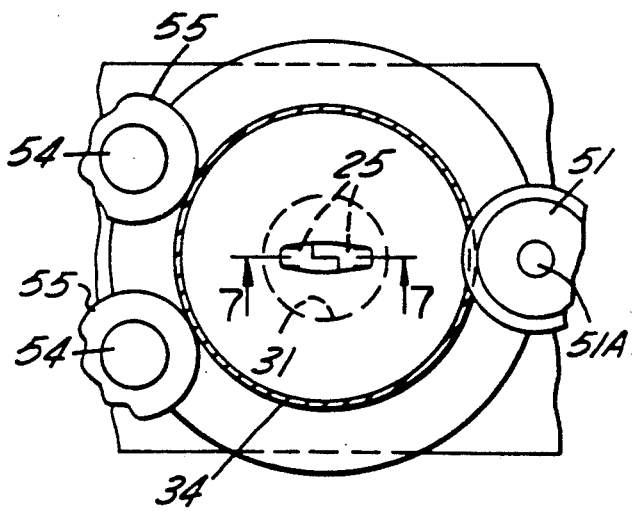
FIG. 6 is a sectional view, taken in the direction of the arrows, along the section line 6—6 of FIG. 5.

In operation, a used oil filter canister 33 is placed over the cam operated jaws 25 when they are in their retracted position. The rod means are advanced to grip the filter canister 33 by having the outwardly extending hook-like portions 26 of the cam operated jaws 25 grasp the end wall 30 of the threaded aperture 31 found in the base portion 32 of the filter canister 33. The rotating means 23 are then operated to rotate the filter canister 33 while the separating means 24 are operated. The directional valve 62 is operated to cause the cylinder shaft 57 to advance the second slidable jaw 52 toward the first slidable jaw 45 to cause circular rollers or supports 55 to apply pressure to the filter canister cover 34. The circular cutter 51 is then advanced by the operator turning the knob 49 until the filter cover is severed, as shown in FIG. 6. The air cylinder shaft 57 is then retracted. The rod means 29 are retracted, and the base 32 of the filter canister 33 is removed from the griping means 22.

Figure 8:
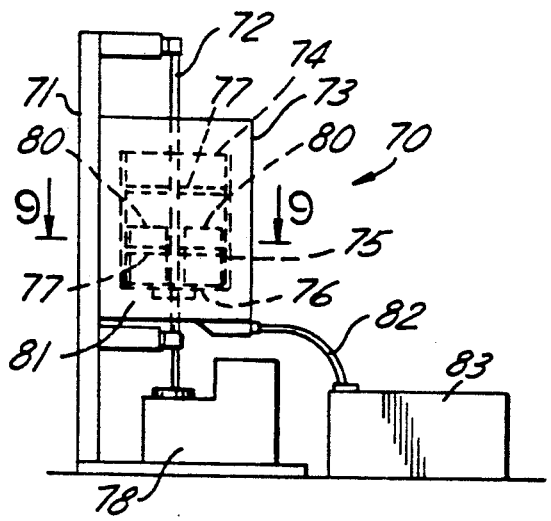
FIG. 8 is an elevational view showing a construction embodying the spinning means of the present invention.
Figure 9:
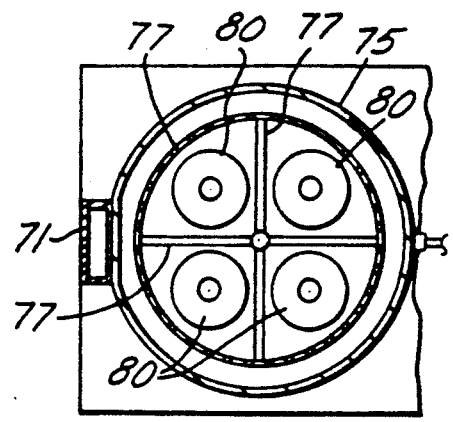
FIG. 9 is a sectional view, taken in the direction of the arrows, along the section line 9—9 of FIG. 8.

Referring now to FIGS. 8 and 9, the further processing of the used filter elements 80 can be seen. The means to spin, generally indicated by the numeral 70, will include a shaft support means 71, in which there is journaled for rotation a shaft 72. Encircling the shaft, and fixedly mounted to the shaft support means is an open-top, cylindrical drum 73. The bottom of shaft 72 passes through the bottom wall of cylindrical drum 73. Mounted to the shaft 72 is an open-top interior drum 74 having mesh sides 75 and a solid bottom 76. Interiorly of the open-top interior drum 74 are support or spacer bars 77 to add stiffness to the drum and to provide appropriate support and spacing for the filter elements 80.

A suitable drive means 78 rotates the open-top interior drum 74 within the cylindrical drum 73 to, in effect, centrifuge the oil captured within the used filter elements 80. The expelled oil first flows by gravity to the bottom of the open-top, cylindrical drum 73 which acts as a second reservoir 81. This is connected by second conduit 82 to spin oil reservoir 83. The drive means 78 may be any suitable drive means, such as an air motor, an electric motor, or a hydraulic motor, and may either be direct drive, belt driven or gear driven.

In the preferred embodiment, the drive means 78 is an adjustable speed drive such as manufactured by the Dayton Electric Manufacturing Company of Chicago, Ill. The particular model adjustable speed drive will depend on the particular application to which the drive is to be put, but generally the adjustable speed drives are preferred because the spin means must spin the used filter elements 80 at a relatively low speed, and speed adjustments will need to be made depending on the filter elements being spun. These characteristics make the use of the adjustable speed drives particularly desirable. The used oil filter elements 80, when all of the oil is removed therefrom, are suitable for use in landfills.

Figure 10:
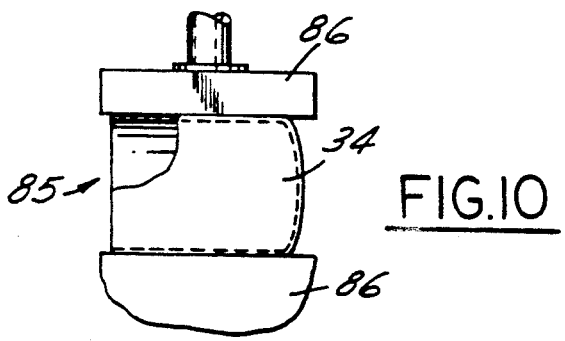
FIG. 10 is a diagrammatic view of a construction embodying the crushing means of the present invention.

Referring now to FIG. 10, the crushing means is shown, wherein the filter cover 34 is placed between a pair of opposed jaws 86 to crush the cover when the jaws are operated. The jaws may be operated by means well known in the art, and one or both of the jaws 86 may be movable.

Figure 11:
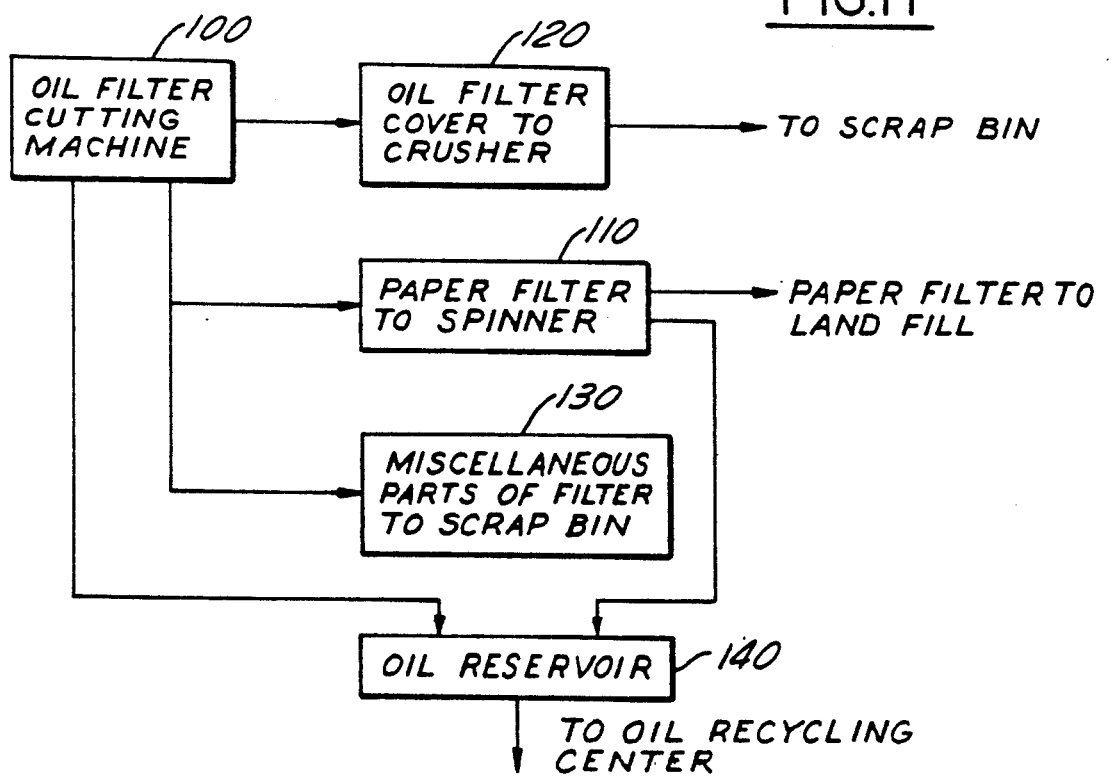
FIG. 11 is a flow chart embodying many of the steps used in the method of the present invention.

An illustration of the steps involved in practicing the method of the present invention can be seen by referring to FIG. 11. A filter canister 33 of the type having a base portion 32 and a cover portion 34 is put into a separating means 24 as illustrated at Box 100. The cover is then removed from the base portion to gain access to the filter element 80, and the paper filter element is sent to the spin means 70 as illustrated at Box 110. The oil filter cover is sent to the crushing means as indicated at Box 120, and the miscellaneous parts are removed from the filter base (Box 130), while the oil from the spin means and the separating means is collected in the oil reservoir (Box 140).

Thus, by carefully studying the problems involved in recycling used oil filters, and investigating the prior art methods and apparatuses which were available to date, an improved method and apparatus for recycling used oil filters has been provided.

I claim:

1. A system for recycling used oil filters of the type having a filter element contained within a filter canister, said canister including a base portion with a hole therein and a cover portion, said system including, in combination:
   (a) a gripping means to grasp a used oil filter by its base portion, with the filter canister in an inverted position, said gripping means comprising a pair of cam operated jaws for grasping said base portion through the hole therein and means to open and close said jaws;
   (b) means to rotate said filter while it is held in said gripping means, said rotating means comprising a turntable rotatably mounted to a base member, said turntable having a centrally located opening therein, through which said jaws protrude;
   (c) a reservoir to collect the oil released from said used oil filter; and
   (d) cutting means to cut the filter canister proximate the base portion to permit the removal of said cover portion, thereby providing access to said filter element.

2. The system defined in claim 1, wherein said cutting means includes;
   (a) a first slidable jaw slidably mounted to said base member on one side of said turntable;
   (b) a second slidable jaw slidably mounted to said base member in a 180° opposed relationship to said first jaw;
   (c) first adjustment means to cause selective reciprocation of said first jaw means;
   (d) second adjustment means to cause selective reciprocation of said second jaw means;
   (e) a cutter rotatably mounted on said first jaw means; and
   (f) a support means mounted on said second jaw means opposite said cutter means.

3. The system defined in claim 2, wherein said first adjustment means includes a manually rotatable screw attached to said first jaw to cause movement thereof when said screw is rotated, and said second adjustment means includes an air cylinder having a shaft, said shaft connected to said jaw to cause reciprocation thereof upon operation of said air cylinder.

4. The system defined in claim 3, wherein said rotating means further includes:
   (a) a first gear connected to said turntable in axial alignment therewith;
   (b) an air motor mounted to said base member; and (c) a second gear mounted to said air motor for rotation thereby; and
(d) a chain connecting said first gear and second gear to cause rotation of said turntable upon operation of said air motor.

5. The system defined in claim 4, wherein said means to open and close said jaws includes:
(a) a push rod passing through said central opening in said turntable and mounted for reciprocal movement therethrough; and
(b) a ball bearing interposed between said push rod cam surfaces on said jaws.

6. The system defined in claim 5, and further including:
(a) means to crush said filter cover portion.

7. The system defined in claim 6, and further including:
(a) means to spin said filter element to remove the oil therefrom.

8. The system defined in claim 7, wherein said means to crush includes:
(a) a pair of opposed jaws operable to crush an oil filter cover portion placed therebetween; and
(b) jaw operating means connected to said crushing jaws to close and open said crushing jaws.

9. The system defined in claim 6, wherein said means to spin includes:
(a) a cylindrical drum open at one end and having a solid bottom and sidewall;
(b) shaft support means to support a shaft for rotation centrally of said cylindrical drum;
(c) a shaft mounted to said shaft support means for rotation;
(d) an interior drum having a solid bottom, mesh sides and an open top mounted to said shaft for rotation within said cylindrical drum; and
(e) drive means connected to said shaft to rotate the same and thereby rotate said interior drum.

10. The system defined in claim 9, wherein means to crush further includes:
(a) a pair of opposed jaws operable to crush an oil filter cover portion placed therebetween; and P1
(b) operating means to selectively operate said crushing jaws when desired.

11. The system defined in claim 1, and further including:
(a) means to crush said filter cover portion.

12. The system defined in claim 11, and further including:
(a) means to spin said filter element to remove used oil therefrom.

13. The apparatus defined in claim 11, wherein said means to spin further includes:
(a) a cylindrical drum open at one end and having a solid bottom and side wall;
(b) shaft support means to support a shaft for rotation centrally of said cylindrical drum;
(c) a shaft mounted to said shaft support means for rotation;
(d) an interior drum having a solid bottom, a mesh side wall, and an open top mounted to said shaft for rotation within said cylindrical drum; and
(e) drive means connected to said shaft to rotate the same, and thereby rotate said interior drum within said cylindrical drum.

* * * * *